United States Patent [19]

Hirshman et al.

[11] 4,120,875

[45] Oct. 17, 1978

[54] NOVEL CURING AGENTS DERIVED FROM ORGANOTHIOSTANNOIC ACIDS

[75] Inventors: Justin L. Hirshman, East Brunswick, N.J.; Robert V. Russo, Brooklyn, N.Y.

[73] Assignee: M&T Chemicals Inc., Stamford, Conn.

[21] Appl. No.: 500,248

[22] Filed: Aug. 26, 1974

[51] Int. Cl.$^2$ ............................................. C07D 307/60
[52] U.S. Cl. ............................. 260/346.11; 260/429.7
[58] Field of Search ............... 260/346.1, 429.7, 2 EA, 260/2 EC, 47 EC, 346.11

[56] References Cited

U.S. PATENT DOCUMENTS

| | | | |
|---|---|---|---|
| 3,244,670 | 4/1966 | Puchala et al. | 260/2 EC |
| 3,264,230 | 8/1966 | Proops | 260/2 EC |
| 3,769,226 | 10/1973 | Markovitz et al. | 260/2 EA |

*Primary Examiner*—John D. Randolph
*Attorney, Agent, or Firm*—Kenneth G. Wheeless; Robert Spector

[57] ABSTRACT

Epoxide compounds are cured rapidly at relatively low temperatures by reaction products of a carboxylic acid anhydride and an organothiostannoic acid anhydride or mixtures containing these two compounds. The cured products exhibit good physical and electrical properties.

3 Claims, No Drawings

NOVEL CURING AGENTS DERIVED FROM ORGANOTHIOSTANNOIC ACIDS

BACKGROUND

This invention relates to curing accelerators for resin compositions containing an epoxide compound and a carboxylic acid anhydride.

It is known that carboxylic acid anhydrides are effective curing agents for epoxide compounds. The resultant resins contain carbonyloxy radicals

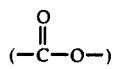

that impart a desirable combination of high strength, thermal stability and high electrical resistance. The reaction between epoxide compound and acid anhydride is often relatively slow even at elevated temperatures. A number of acidic and basic compounds are therefore often employed as accelerators in epoxide-anhydride formulations. Phenols and tertiary amines are conventional accelerators, however both these classes of compounds are skin irritants and therefore undesirable, particularly in commercial scale operations employing large amounts of accelerators.

An objective of this invention is to provide accelerators that cure epoxide-anhydride compositions at relatively low temperatures without the hazards to operating personnel associated with use of prior art phenolic and amine accelerators. This objective can be achieved if the anhydride is first reacted with an organothiostannoic acid anhydride of the formula $(RSnS_{1.5})n$ before being combined with the epoxide. In contrast to the monoorganotin compound, the reaction products are compatible with all classes of the epoxide compounds. When the epoxide compound is a relatively reactive one, such as a cycloaliphatic epoxide, an unreacted mixture containing the carboxylic acid anhydride and organotin compound is usually an effective curing agent.

SUMMARY OF THE INVENTION

One class of novel curing agents consist of reaction products obtained by heating a mixture containing a carboxylic acid anhydride and between 0.1 and 70%, based on the total weight of both reactants, of an organothiostannoic acid anhydride exhibiting the formula $(RSnS_{1.5})n$ wherein R represents an alkyl radical containing between 1 and 20 carbon atoms, a cycloalkyl, aralkyl, aryl or alkaryl radical and n is an integer between 2 and 5, inclusive.

The second class of curing agents, which are useful for the more reactive types of epoxides, are physical mixtures of an organothiostannoic acid anhydride and a carboxylic acid anhydride.

This invention also provides curable resin compositions consisting essentially of an epoxide compound and between 5 and 65%, based on the weight of the composition, of one of the present curing agents.

DETAILED DESCRIPTION OF THE INVENTION

The organotin component of the present curing agents is an organothiostannoic acid anhydride, which is believed to exist as an oligomer containing between 2 and 5 repeating units of the general formula $RSnS_{1.5}$. Each tin atom is bonded to 3 sulfur atoms by single bonds, which is equivalent to 1.5 sulfur atoms per repeating unit, since sulfur is a bivalent element. In the foregoing formulae R represents an alkyl radical containing between 1 and 20 carbon atoms, a cycloalkyl, alkaryl, aralkyl or aryl radical.

The existence of the present reaction products as a single chemical entity rather than a mixture of the two components is demonstrated by the fact that an effective curing agent for aliphatic and aromatic epoxide compounds is obtained only when the components are heated together for between 30 minutes and about 2 hours at temperatures between about 100° and 200° C. Heating the organotin compound together with the anhydride only to the extent that they form a homogeneous mixture will not produce an effective curing agent for these less reactive types of epoxide compounds. Moreover, the present organotin compounds do not accelerate curing when added to an epoxide compound or to a mixture of an epoxide compound with a carboxylic acid anhydride when the epoxide radicals

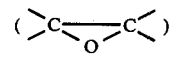

are not part of a cycloaliphatic ring structure.

As previously disclosed, the anhydride-organotin reaction products contain between 0.1 and 70% by weight of the organotin compound, preferably between 1 and 40%. The optimum concentration of organotin compound is directly related to the reactivity of the epoxide. This subject will be discussed in greater detail in a subsequent section of this specification.

The hydrocarbon radical bonded to the tin atom (represented by R in the foregoing formula) does not enter into the reaction, and is therefore not considered critical to the operability of the present curing agents. Compounds wherein R is an alkyl radical, particularly methyl, butyl or octyl, are preferred because they are readily available.

The organothiostannoic acid anhydrides that are reacted or combined with a carboxylic acid anhydride to form the present curing agents are either available from commercial suppliers or can readily be prepared using known procedures.

The carboxylic acid anhydride component of the present curing agents is derived from a mono- or dicarboxylic acid. For convenience in processing it is considered desirable but nor mandatory that both the anhydride and the reaction product or mixture of the anhydride with the organotin compound be liquids at ambient temperature. Two such liquid anhydrides of dicarboxylic acids are dodecenylsuccinic anhydride and the Diels-Alder reaction product of methylcyclopentadiene and maleic anhydride. The latter is available as Nadic Methyl Anhydride (NMA) from the Allied Chemical Company. Other suitable anhydrides include:

aliphatic monobasic acid anhydrides such as propionic, acetic and butyric anhydrides;

aromatic monobasic acid anhydrides such as benzoic and naphthoic anhydrides;

aliphatic polybasic acid anhydrides such as azelaic and sebasic anhydrides;

aliphatic cyclic polybasic acid anhydrides such as succinic, alkenylsuccinic, itaconic and citraconic anhydrides and adducts of maleic anhydride with cyclic diolefins, including cyclopentadiene;

aromatic cyclic polybasic acid anhydrides such as phthalic anhydride, benzophenonetetracarboxylic dianhydride, pyromellitic dianhydride, ethylene glycol bistrimellitate dianhydride, glycerol tristrimellitate trianhydride, trimellitic anhydride, chlorendic (HET anhydride), tetrabromophthalic and tetrachlorophthalic anhydride;

mixtures containing two or more of the foregoing anhydrides.

Epoxide compounds that are converted to solid products using the present curing agents contain two or more 1,2-epoxides radicals represented by the formula

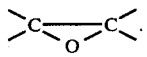

Diglycidyl ethers of dihydric phenols such as Bisphenol A and cycloaliphatic compounds containing two 1,2-epoxide groups are conventionally reacted with carboxylic acid anhydrides. One type of liquid Bisphenol A diglycidyl ether is available as Epoxide 6010 from the Ciba-Geigy Chemical Company and has an epoxide equivalent weight from 185 to 196. Epon ® 828 from the Shell Chemical Company, having an epoxide equivalent weight of from 185 to 190, is also suitable. Typical cycloaliphatic epoxide compounds are Epoxide CY-179, available from Ciba-Geigt and Bakelite Epoxy ERL-4221 manufactured by Union Carbide Corporation. The epoxide equivalent weight of the latter compound is from 131 to 143. Epoxidized novolac resins, epoxidized unsaturated componds (including diene compounds), epoxidized glycerides and oils, as well as glycidyl ethers of aliphatic compounds containing two or more hydroxyl radicals, such as 1,4-butanediol, are suitable epoxide compounds. Diglycidyl ethers of aliphatic diols containing between 2 and about 10 carbon atoms or the corresponding triols may require reaction with difunctional chain-extending agents such as primary amines or polyols, including poly(ethylene glycols), to attain a molecular weight that will yield solid cured products exhibiting the good tensile properties that characterize epoxide resins. Mixtures containing two or more epoxide compounds, optionally with a monofunctional epoxide compound, may be advantageous to achieve a desired viscosity or reactivity with the present curing agents.

As is true for other accelerators, the relative concentration of organotin compound required to achieve a desired polymerization or curing rate is directly proportional to the reactivity of the epoxide compound or compounds to be cured or polymerized. Considered as a class, compounds wherein the two carbon atoms that constitute the epoxide radical form part of a cycloaliphatic ring structure or wherein one of the carbon atoms of the epoxide radical is bonded to a carbon atom of a cycloaliphatic ring structure are the most reactive of all epoxide compounds in the presence of Lewis acids, which include the present curing agents, and therefore require a relatively low concentration of organotin compound to promote curing. Curing agents containing between 0.1 and about 20% by weight of the organotin compound will cure cycloaliphatic epoxide compounds using heating periods of from several minutes to several hours. Less reactive epoxide compounds, such as the diglycidyl ethers of dihydric phenols, aliphatic hydroxy compounds and olefin oxides require between 10 and 70% by weight of organotin compound in the carboxylic acid anhydride-organotin compound reaction product to achieve curing rates comparable to those of the cycloaliphatic epoxide compositions.

Irrespective of the type of epoxide selected, the rate of cure and physical properties of the cured resin will be dependent to a large extent upon the total concentration of organotin compound and carboxylic acid anhydride. The two components of the curing agent together should constitute between 5 and 65%, based on the combined weight of epoxide compound and curing agent.

The following examples demonstrate preferred embodiments of the present curing agents and should not be interpreted as limiting the scope of the present invention as defined in the accompanying claims. All parts and percentages are by weight unless otherwise specified.

EXAMPLE A

A mixture containing four parts of Nadic Methyl Anhydride and 1 part butyl thiostannoic acid anhydride was heated for 1.5 hour at 145° to 175° C. The contents of the reaction vessel were heated electrically, the voltage supplied to the heater being maintained constant throughout the reaction. The product was a homogeneous milk-white suspension which did not settle when the suspension remained undisturbed for several hours.

EXAMPLE B

The procedure of Example A was repeated using five parts of Nadic ® Methyl Anhydride and one part of butyltin-S',S',S"-tris(isooctyl mercaptoacetate), the latter being substituted for the butylthiostannoic acid anhydride of Example A. The resultant mixture was heated at a temperature of 150° C. for 1 hour while being stirred. The reaction product was a clear, reddish-brown viscous liquid.

EXAMPLE C

The procedure of Example B was repeated using dibutyltin sulfide as the organotin compound. The reaction product was a clear yellow solution.

EXAMPLE D

A mixture containing 4 parts Nadic ® Methyl Anhydride and 1 part butylstannoic acid anhydride was heated at 170° C. for between 1.5 and 2 hours. The resultant mixture was difficult to homogenize and contained lumps of the solid organotin compound. Increasing the temperature to 210° C. did not yield a stable dispersion.

EXAMPLE 1

An epoxide formulation prepared using the accelerator of Example A (20 grams) and 30 grams of a diglycidyl ether of Bisphenol A exhibiting an epoxide equivalent weight of 178 g. was poured into a 3 inch (7.6 cm.)-diameter aluminum cup. The cup was then placed in an oven heated to 130° C. During the first 20 minutes of heating the original cloudy liquid became clear and began to solidify, at which time the formulation was removed from the oven and allowed to cool. After 75 minutes of cooling the formulation was a hard, non-deformable solid. The elapsed heating time required to attain a noticeable thickening of the formulation will be referred to as the gel time.

The foregoing procedure was repeated substituting an equal weight of the reaction product of Example B, C or D for the product of Example A. The composition containing the reaction product of Example B was only partially cured after being heated for 135 minutes, the resin being soft and readily deformable at ambient temperature. The sample containing the curing agent of Example C was a viscous liquid at ambient temperature after being heated for 189 minutes. The curing agent of Example D required 40 minutes of heating to attain the gel stage. The cooled resin was a hard solid.

For purposes of comparison a curing agent was prepared by combining 0.1 part of benzyl dimethyl amine and 4 parts of Nadic ® Methyl Anhydride. The epoxide formulation contained 20 grams of this mixture and 30 grams of Bisphenol A diglycidyl ether of Example 1. After being poured into a cup and heated at 130° C. for 40 minutes the resin was still soft after cooling to ambient temperature. The relative amounts of amine, anhydride and epoxide resin are within the range of formulations suggested by the prior art. Benzyl dimethyl amine is a known accelerator for the reaction between epoxide compounds and carboxylic acid anhydrides.

Of the four organotin compounds tested only butyl thiostannoic acid anhydride and butyl stannoic acid anhydride yielded hard, non-deformable resins. The latter required a considerably longer gel time than the butyl thiostannoic acid anhydride (40 vs. 20 minutes) and yielded an opaque resin, which is undesirable for some end uses. The present curing agent was therefore considered markedly superior in performance to a butyl stannoic acid anhydride-carboxylic acid anhydride reaction product.

EXAMPLE 2

This example demonstrates that an unreacted mixture of an alkylthiostannoic acid with an acid anhydride is an effective curing agent for compounds wherein the two epoxide groups present form part of a cycloaliphatic ring structure.

A mixture containing 30 parts of 3,4-epoxy-cyclohexylmethyl-3,4-epoxycyclohexane carboxylate, 20 parts of Nadic ® Methyl Anhydride and 0.5 part butyl thiostannoic acid was heated to a temperature of 130° C. in a Shyodu Gel Timer equipped with a motor-driven revolving probe that was immersed in the mixture. After a 41 minute interval the mixture solidified to the extent that the probe could no longer revolve, indicating that the gel point had been reached.

A second mixture containing 30 parts of the epoxide compound, 20 parts of the acid anhydride and 0.25 part butyl thiostannic acid required 60 minutes of heating at 130° C. to attain the gel point. The epoxide compound and acid anhydride were the same ones employed in the first part of this example.

What is claimed is:

1. A curing agent for epoxide compounds, wherein said curing agent consists essentially of the reaction product obtained by heating at between 100° and 200° C. for between 30 and about 120 minutes a mixture comprising 1) a carboxylic acid anhydride selected from the group, consisting of acetic, propionic, butyric, benzoic, naphthoic, azelaic, sebasic, succinic, alkenylsuccinic, itaconic, citraconic, phthalic, maleic, trimelletic, chlorendic, tetrabromophthalic and tetrachlorophthalic anhydrides, benzophenonetetracarboxylic, pyromellitic dianhydride, ethylene glycol bis-trimellitate dianhydride, glycerol tris-trimellitate trianhydride and adducts of maleic anhydride with cyclic diolefins, and 2) between 0.1 and 70%, based on the total weight of both reactants, of an organothiostannoic acid anhydride exhibiting the formula $(RSnS_{1.5})n$ wherein R represents an alkyl radical containing between 1 and 20 carbon atoms and n represents an integer between 2 and 5, inclusive.

2. A curing agent as described in claim 1 wherein R is butyl and the anhydride is Nadic Methyl Anhydride.

3. A curing agent as described in claim 1 wherein R is an alkyl radical containing between 1 and 12 carbon atoms.

* * * * *